Feb. 6, 1968 H. BENDIG ETAL 3,367,760

METHOD FOR MAKING ELECTRICAL HOUSINGS

Filed June 14, 1965

Inventors:
Hans Bendig
Horst Bucher
Rudolf Mettke
By: Spencer & Kaye
Attorneys

United States Patent Office 3,367,760
Patented Feb. 6, 1968

3,367,760
METHOD FOR MAKING ELECTRICAL HOUSINGS

Hans Bendig, Ulm (Danube), Horst Bucher, Neu-Ulm, and Rudolf Mettke, Ulm (Danube), Germany, assignors to Telefunken Patentverwertungsgesellschaft m.b.H., Ulm (Danube), Germany Filed June 14, 1965, Ser. No. 463,528
Claims priority, application Germany, June 13, 1964, T 26,369
2 Claims. (Cl. 65—54)

Figure 1:
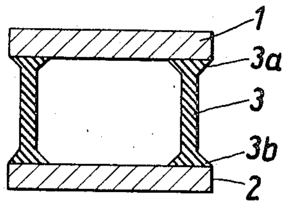

The present invention relates to a housing for microwave elements, and more particularly to a housing having certain electrical characteristics, such as low capacitance.

It is desirable in providing a housing for microwave elements that the housing have as low an electrical capacitance and inductance as possible. However, these two desirable characteristics are usually not possible to obtain simultaneously in a housing which must also be preferably of a small size. In order to obtain a low capacitance, the distance between the metallic members of the housing should be as great as possible. This, of course, would result in a housing which, besides being too large, would also have too high an inductance. Conversely, decreasing the distance between the metallic members will decrease the inductance but will, at the same time, increase the capacitance of the housing. Consequently, it has been the prior practice to compromise by designing the housing to have small dimensions, resulting in a low inductance, but not so small that the capacitance is too high. This has been accomplished by choosing an insulating spacer having a low dielectric constant and by making its wall thickness as small as possible. This has raised an additional problem in that the more the wall thickness is reduced, the weaker the joint between the metallic members and the insulating spacer becomes. The point is soon reached where the mechanical strength of the housing and its seal or imperviousness with respect to ambient atmospheres no longer satisfy the requirements of the art.

It is therefore an object of this invention to provide an improved housing for microwave elements.

A further object is to provide an improved housing having a low capacitance and a low inductance.

Another object is to provide a method for fabricating a housing for microwave elements which housing has desired properties of low inductance, low capacitance, small size, and adequate structural strength.

These and other objects are accomplished by providing a housing for microwave elements having a low inductance and capacitance, and at the same time small dimensions and high mechanical strength at its joints, as well as imperviousness. The top and bottom metallic sections are connected by a ring interposed therebetween. This ring is non-uniform in cross section, being consideraby thinner at its middle portion than at the ends adjacent to and joined to the metallic sections.

According to the present invention, the housing is fabricated by positioning an insulating ring between two metallic members, heating the ring until it adheres to the metallic members, and then stretching the resulting structure so that the wall thickness of the ring becomes thinner at its center portion than at its ends adhering to the metallic members.

Additional objects and advantages of the present invention will become apparent upon consideration of the following description when taken in conjunction with the assompanying drawings in which:

FIGURE 1 is a cross-sectional view of one embodiment of a housing.

Figure 2A:
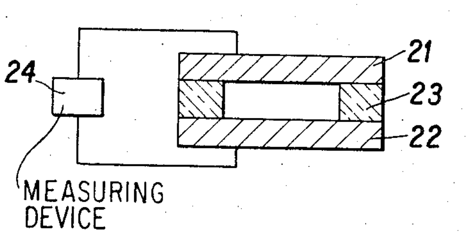
Figure 2B:
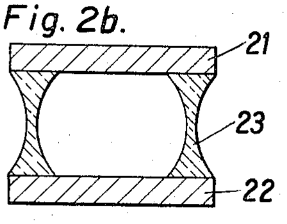

FIGURES 2*a* and 2*b* illustrate two steps in the method of making a housing according to the present invention.

Figure 3:
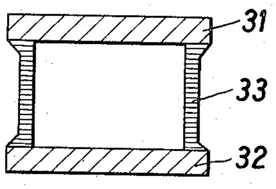

FIGURE 3 is a cross section of another embodiment of a housing.

With more particular reference to the drawings, FIGURE 1 shows a housing comprising upper and lower metallic members, or electrodes 1 and 2 and an insulated body, ring or spacer 3 positioned between the members 1 and 2. The spacer 3 is not uniform in cross section, being larger at 3*a* and 3*b*, where the insulated body is joined or connected to the metallic members 1 and 2, than at the remainder of the body. The ratio of the cross sections of the spacer 3 is inversely proportional to the strength of the material at the respective cross sections. The transitions between the different cross sections should be smooth and gradual so as to minimize the danger of the spacer 3 breaking due to notch effects at the transition points.

FIGURES 2*a* and 2*b* disclose two steps in the method of fabricating such a housing. A glass or plastic ring 23 is positioned between two metal members 21 and 22. The ring 23 is then heated to a plastic state so that it is fused or welded to the metallic members. The assembly is then pulled or stretched until the ring 23 assumes a concave-concave shape, in cross section, as shown in FIGURE 2*b*. In order to insure that the housing has the desired capacitance, this capacitance can be measured, during the fabricating process, by a measuring device 24 which is electrically connected to electrodes 21 and 22, and the stretching of ring 23 stopped when the desired value is reached.

Another embodiment of the invention is disclosed in FIGURE 3, in which the inside walls of the ring or spacer 33 are relatively straight and the outside walls are so shaped that the portions adjacent to the upper and lower members 31 and 32 are thicker than the remainder of the wall, e.g., have a wedge shape. With this type of wall the desired low capacitance and low inductance as well as the desired structural strength are also achieved.

It can thus be seen that the present invention provides a housing having a low capacitance, preferably for use in microwave structural elements. This housing has a low inductance and capacitance and the metal-insulating body connection or joint nevertheless has a high strength and a good seal. The housing includes two metallic electrodes and one insulating body. The wall thickness of the insulating body is relatively large at the connection zones with the metal. However, in the remaining portions it is considerably thinner and the ratio between the cross section of the insulating body in the connection zones with the metal and the cross section of the remaining insulating body are about inversely proportional to the strengths of the material at the respective places, that is, in the connection zone and in the remaining portions. The transition between the two cross sections should not be abrupt but rather should be gradual, such as oblique in order to eliminate the danger of breaking due to notch effects. Thus, a housing is obtained having a low capacitance and high stability and imperviousness with respect to external medias.

The present invention is particularly simple and easy to practice when the insulating body is an annulus and is constructed of glass. The glass is melted between the metal electrodes and the metal electrodes are then moved apart in the longitudinal direction of the housing after the electrodes are contacted by the molten glass so that the glass in this viscous form assumes a shape which tapers toward the middle or becomes thinner in that portion of the wall because of the surface stress. Plastic can also be used instead of glass.

The term "strength of the material" as used in this specification and in the claims refers to the strength per unit square cross section, e.g., square centimeter.

It will be understood that the above description of the present invention is susceptible to various modifications, changes and adaptations, and the same are intended to be comprehended within the meaning and range of equivalents of the appended claims.

What is claimed is:

1. A method for fabricating a housing for microwave elements said housing having a low electrical capacitance, comprising, positioning an insulated ring between two metallic members, heating said ring until it adheres to the metallic members, and then stretching said resulting structure so that the wall thickness of said ring becomes thinner at its center portion than at its ends adhering to the metallic members.

2. A method as defined in claim 1 including the further step of measuring the capacitance of the housing during its fabrication and stopping said stretching operation when a desired capacitance has been achieved.

References Cited

UNITED STATES PATENTS

| | | | |
|---|---|---|---|
| 2,523,155 | 9/1950 | Shoupp | 29—195.5 X |
| 2,773,289 | 12/1956 | Martin et al. | 65—59 X |
| 2,951,735 | 9/1960 | Meese | 65—155 X |
| 3,261,730 | 7/1966 | Pell | 65—59 X |

S. LEON BASHORE, *Acting Primary Examiner.*

DONALL H. SYLVESTER, *Examiner.*

R. L. LINDSAY, *Assistant Examiner.*